(12) United States Patent
Stevens

(10) Patent No.: US 7,089,457 B2
(45) Date of Patent: Aug. 8, 2006

(54) EFFICIENT I/O RETRY OVER QDIO

(75) Inventor: Jerry Wayne Stevens, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 10/123,728

(22) Filed: Apr. 16, 2002

(65) Prior Publication Data

US 2003/0208635 A1 Nov. 6, 2003

(51) Int. Cl.
*G06F 11/00* (2006.01)
(52) U.S. Cl. .......................... 714/43; 710/36
(58) Field of Classification Search .............. 714/43, 714/9; 710/308, 310, 5, 36, 50; 709/212
See application file for complete search history.

(56) References Cited

U.S. PATENT DOCUMENTS

| | | | | |
|---|---|---|---|---|
| 4,763,249 | A * | 8/1988 | Bomba et al. ............. | 713/600 |
| 5,148,545 | A * | 9/1992 | Herbst et al. .............. | 710/240 |
| 5,513,376 | A * | 4/1996 | Lohmeyer ................ | 710/53 |
| 6,108,739 | A * | 8/2000 | James et al. .............. | 710/113 |
| 6,317,799 | B1 * | 11/2001 | Futral et al. .............. | 710/22 |
| 6,333,938 | B1 * | 12/2001 | Baker ..................... | 370/503 |
| 6,425,021 | B1 * | 7/2002 | Ghodrat et al. ........... | 710/22 |
| 6,717,947 | B1 * | 4/2004 | Ghodrat et al. ........... | 370/395.1 |
| 6,826,619 | B1 * | 11/2004 | Khare et al. .............. | 709/232 |
| 6,880,021 | B1 * | 4/2005 | Easton et al. ............. | 710/5 |
| 6,880,035 | B1 * | 4/2005 | Groeger et al. ........... | 710/308 |
| 2003/0065835 | A1 * | 4/2003 | Maergner et al. ......... | 710/61 |

OTHER PUBLICATIONS

Jennings, Roger, Fire on the Wire: The IEEE 1394 High Performance Serial Bus, Dec. 24, 1998, page 2.*
*Comparing a CMCC to the IBM 3745/3746, 3172 and OSA*, Cisco, <http://www.cisco.com/warp/public/cc/pd/ifaa/ifpz/chifpz/tech/dcdg8_rg.htm>. (Oct. 18, 2001).
Shankland, Stephen, *IBM to Upgrade Mainframe Features*, ZDNetNews, (Oct. 19, 2001).
*Instructions Not Listed In Principles of Operation or Your Yellow/Pink/Blue/White Reference Card*, <http://home-2.worldonline.nl/~jjaeger/opcodes.html>, (Oct. 19, 2001).
*ODIO Mode*, IBM Corporation, <http://www.redbooks.ibm.com/redbooks/SG245948/css/SG245948_25.html>, (Oct. 18, 2001).

* cited by examiner

*Primary Examiner*—Scott Baderman
*Assistant Examiner*—Paul L. Contino
(74) *Attorney, Agent, or Firm*—Steven M. Greenberg; Carey, Rodriguez, Greenberg & Paul, LLP

(57) ABSTRACT

An efficient input/output (I/O) retry method which can be implemented in an enterprise-server configured with QDIO. The method can include attempting a QDIO-based data transfer between outbound and inbound queues in respective sending and target LPARs in the enterprise server. Responsive to detecting a busy condition resulting from the attempt; it can be determined whether the busy condition arose from an asynchronous busy condition. If it is determined that the busy condition arose from an asynchronous busy condition in the target LPAR, any attempt to retry the QDIO-based data transfer can be delayed. Subsequent to the delay, the QDIO-based data transfer can be re-attempted.

3 Claims, 4 Drawing Sheets

EFFICIENT I/O RETRY OVER QDIO

BACKGROUND OF THE INVENTION

1. Statement of the Technical Field

The present invention relates to enterprise server inter-process communications and more particularly to internal queued direct input/output (QDIO).

2. Description of the Related Art

For twenty-six years, the parallel channel fulfilled the role as the sole enterprise server attachment interface. At its introduction, the parallel channel supported a maximum bandwidth of 2.5 Megabytes (MB) per second which ultimately grew to 4.5 MB/second. In the parallel input/output (I/O) infrastructure, a proprietary controller functioned as a wire concentrator for dumb terminals attached to the interface through coaxial cable links. As the parallel I/O infrastructure reached its limitations, however, in its ability to support large system images, high availability, flexible connectivity, configuration management, and performance, IBM Corporation of Armonk, New York introduced ESCON™ technology as a new I/O interconnection architecture supporting a new topology for high-speed, long distance data exchange.

When IBM Corporation first introduced ESCON, the topology of the enterprise server supported data center had begun to change, though access to the underlying network remained unchanged. Specifically, front end processors, interconnect controllers, and similar devices having parallel I/O or ESCON channel attachment interfaces remained the only connectivity options available when accessing enterprise server resources with outbound and inbound network traffic. In consequence, it was believed that providing an industry-standard open interface would simplify the data center topology and begin to lessen the number of devices required between the enterprise server and the end users, while reducing complexity and the total cost of computing. In response, IBM Corporation developed the Open Systems Adapter™ (OSA).

In consequence of the development of OSA, TCP/IP networks and applications began to proliferate in the late 1990s as the enterprise server now could be directly connected to the TCP/IP network through the OSA attachment interface. Moreover, the expense and complexity associated with the use of parallel and ESCON-attached interconnect controllers and routers, as well as front end processors, now could be lessened with TCP/IP traffic and some SNA traffic flowing directly into the enterprise server through the OSA attachment interface. As a result, enterprise servers now could be incorporated within heterogeneous, multi-vendor networking infrastructures.

Recent versions of the OSA attachment interface support queued direct I/O (QDIO). QDIO is an important channel control unit design that dramatically improves data throughput by allowing data to pass directly to enterprise server memory. With QDIO, the number of I/O interruptions can be minimized. Specifically, in the QDIO architecture, a common storage area can be maintained for memory-to-memory communication, reducing system overhead and improving performance. In consequence, read or write channel programs are not necessary for data exchange. Furthermore, I/O interrupts need not be handled for write processing. Similarly, for read processing, the number of I/O interrupts can be minimized. Notably, in the QDIO architecture a Direct Memory Access (DMA) protocol can be used to transfer all network data between the two processing functions in a highly efficient manner while maintaining the inherent reliability and data integrity of the enterprise server I/O subsystem architecture.

Typically, queues in the QDIO architecture include one-hundred and twenty-eight entries, each entry having a storage block address list (SBAL). Ordinarily, an SBAL represents a single, complete read or write I/O operation and includes a fixed number of entries, typically sixteen. Each entry, in turn can be referred to as a storage list entry and can provide its length and a pointer to a memory page or frame of real storage. The page, typically a four kilobyte page, can include one or more data packets, each packet having a protocol header and associated data. Thus, each SBAL can include sixty-four kilobytes of real storage.

Notably, the QDIO architecture can support internal inter-process communications between multiple logical partitions. As is well-known in the art, a logical partition (LPAR) is the division of an enterprise server's processors, memory, and storage into multiple sets of resources so that each set of resources can be operated independently with its own operating system instance and applications. The number of LPARs that can be created typically can depend upon the processor model of the enterprise server and the enterprise server's available resources. Multiple LPARs can be configured within an enterprise server for varying purposes such as database operations, client/server operations or to separate test and production environments. In any event, using an internal implementation of the QDIO architecture, referred to as "iQDIO", each LPAR can communicate with other LPARs as if the other LPAR were physically positioned within a separate enterprise server.

As an example, using an OSA adapter configured with the iQDIO architecture, Internet protocol (IP) based data traffic can flow between LPARs within the same enterprise server. More particularly, the central processor of the iQDIO architecture can examine the IP address of each outbound packet and, if the destination IP address is associated with one of the LPARs residing in the same enterprise server as defined in an address table, the outbound packet can be forwarded directly to the destination LPAR. Notably, the iQDIO architecture can provide better performance and higher availability between LPARs since an external network is not required to transfer outbound IP packets.

In a conventional enterprise server which has been configured for LPAR-to-LPAR interprocess communications using the iQDIO architecture, each LPAR can have associated therewith a channel path ID (CHPID). Typical enterprise servers can accommodate a discrete number of distinct CHPIDs, typically four (4). Using the iQDIO architecture, the central processor and the enterprise server can share data queues, as compared to the conventional use of QDIO technology in which the central processor shares data queues with the I/O adapter. In this way, data packets can be sent and received in each LPAR referenced by particular CHPIDs.

Ordinarily, in order for a given LPAR to gain connectivity to another LPAR within the same enterprise server, the LPAR must be configured to use the same CHPID as the other LPAR. In particular, an iQDIO logical device can be configured within each LPAR. The iQDIO logical device, often referred to as a "subchannel address", can include an inbound (receive) queue, and multiple outbound (send) queues, allowing the logical device to both send and receive data simultaneously through the iQDIO hardware.

In order for the target LPAR to receive data packets transmitted by a sending LPAR, the central processor can queue SBALs in the inbound queue of the target LPAR, thereby making those read buffers available for use by the iQDIO hardware. Normally, sending LPARs use a signal adapter instruction (SIGA) to transmit data packets to a target LPAR. Responsive to receiving the SIGA instruction, the iQDIO hardware can locate the target LPAR and can move the outbound data packets from SBALs in the outbound queue of the sending LPAR to the previously queued SBALs of the inbound queue of the target LPAR. Once inbound data has been forwarded to the target LPAR, the iQDIO hardware can complete the operation by marking those queued SBALs as "complete".

Importantly, as one-skilled in the art will recognize, the SIGA instruction of the iQDIO architecture is synchronous in nature. Specifically, when a SIGA instruction issues, the entire I/O operation can be performed by the same processor which executed the SIGA instruction. When a subsequent instruction gains control, the execution of the SIGA instruction can be assumed to have completed. If the execution of the SIGA instruction succeeds, the data will have been transferred to the SBALs of the inbound queue of the target LPAR. In contrast, if the execution of the SIGA instruction fails, condition codes can be inspected to allow the issuer, be it an application program or the central processor, to interrogate the outcome of the SIGA instruction.

Occasions will arise, however, where the target LPAR does not have an available SBAL queued in the inbound queue to receive inbound data. Inasmuch as the SIGA instruction is synchronous in nature, though, the QDIO hardware cannot suspend operation of the SIGA instruction until an SBAL can be queued by the central processor. Conventional QDIO designs provide for retrying the SIGA operation in this circumstance. Specifically, the central processor can ignore the out-of-storage condition of the inbound queue and either can allow an associated stack to drop, or the central processor can retransmit the data packets. Alternatively, the central processor can retry the SIGA operation one or more times over a period of time.

Both conventional retry options can be expensive in terms of processor cycles and can lack precision. Moreover, both retry options can provide for an unpredictable and unreliable interface. Internal interfaces ought to provide a reliable and not unreliable transport. Since traditional "network" errors are not a factor in the case of LPARs, the iQDIO architecture also should be much more reliable. Accordingly, there has arisen a need for an effective retry method for use in an iQDIO architecture.

SUMMARY OF THE INVENTION

The present invention is an efficient I/O retry method which can be implemented in an enterprise-server configured with QDIO. The method can include attempting a QDIO-based data transfer between outbound and inbound queues in respective sending and target LPARs in the enterprise server. Responsive to detecting a busy condition resulting from the attempt; it can be determined whether the busy condition arose from an asynchronous busy condition, such as an out-of-storage (OOS) condition, in the target LPAR. If it is determined that the failure condition arose from an asynchronous busy condition in the LPAR, any attempt to retry the QDIO-based data transfer can be delayed. Subsequent to the delay, the QDIO-based data transfer can be re-attempted.

The method further can include determining whether the failure condition arose from a synchronous busy condition such as the failure to acquire a lock on the inbound queue. If it is determined that the failure condition arose from a synchronous busy condition, the QDIO-based data transfer can be immediately and repeatedly re-attempted either until the re-attempts are successful, or until the repeated re-attempts exceed a threshold limit. If the repeated re-attempts exceed the threshold limit, an error condition can be posted from which no retry can be attempted.

The present invention also can include a QDIO retry system. As in conventional QDIO systems, the QDIO retry system of the present invention can include a common bus interface, one or more LPARs, and a QDIO system configured to execute data transfers between the sending and receiving LPARs through the common bus interface. As in the case of a conventional QDIO system, each LPAR can include at least one sending LPAR and at least one receiving LPAR. Furthermore, each sending LPAR can include at least one outbound queue, and each target LPAR can include an inbound queue. Finally, each queue can include a plurality of SBALs, each SBAL containing pointers to memory blocks which can be accessed through the common bus interface.

Notably, unlike prior art QDIO systems, the QDIO retry system of the present invention also can include two or more condition codes. One of the condition codes can specify a retriable error condition arising from one of a synchronous and an asynchronous busy condition in a target LPAR. At least one other condition code can specify a non-retriable error condition. Finally, the QDIO retry system of the present invention can include a retry processor configured to respond to the busy conditions indicated by the condition codes. In particular, the retry processor can be configured to asynchronously retry data transmissions responsive to detecting an asynchronous busy condition. The retry processor also can be configured to synchronously retry data transmissions responsive to detecting a synchronous busy condition.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENT

The present invention is an I/O retry system and method for use in an iQDIO-enabled enterprise server. The I/O retry system and method can monitor the progress of an iQDIO transaction between a sending LPAR and a target LPAR invoked through the SIGA directive. Based upon this monitoring, intelligent feedback can be provided to the sending LPAR. The intelligent feedback can indicate when the target LPAR has experienced a "receiver not ready" or "out of storage" condition. In response, the sending LPAR can attempt to retry the SIGA where appropriate. Importantly, unlike prior art retry methods typically used in iQDIO transactions, in the present invention, the sending LPAR and the central processor managing the process can modify its retry strategy based upon the type of feedback provided by the target LPAR. Hence, the present invention is a "precise" I/O retry system.

Figure 1:
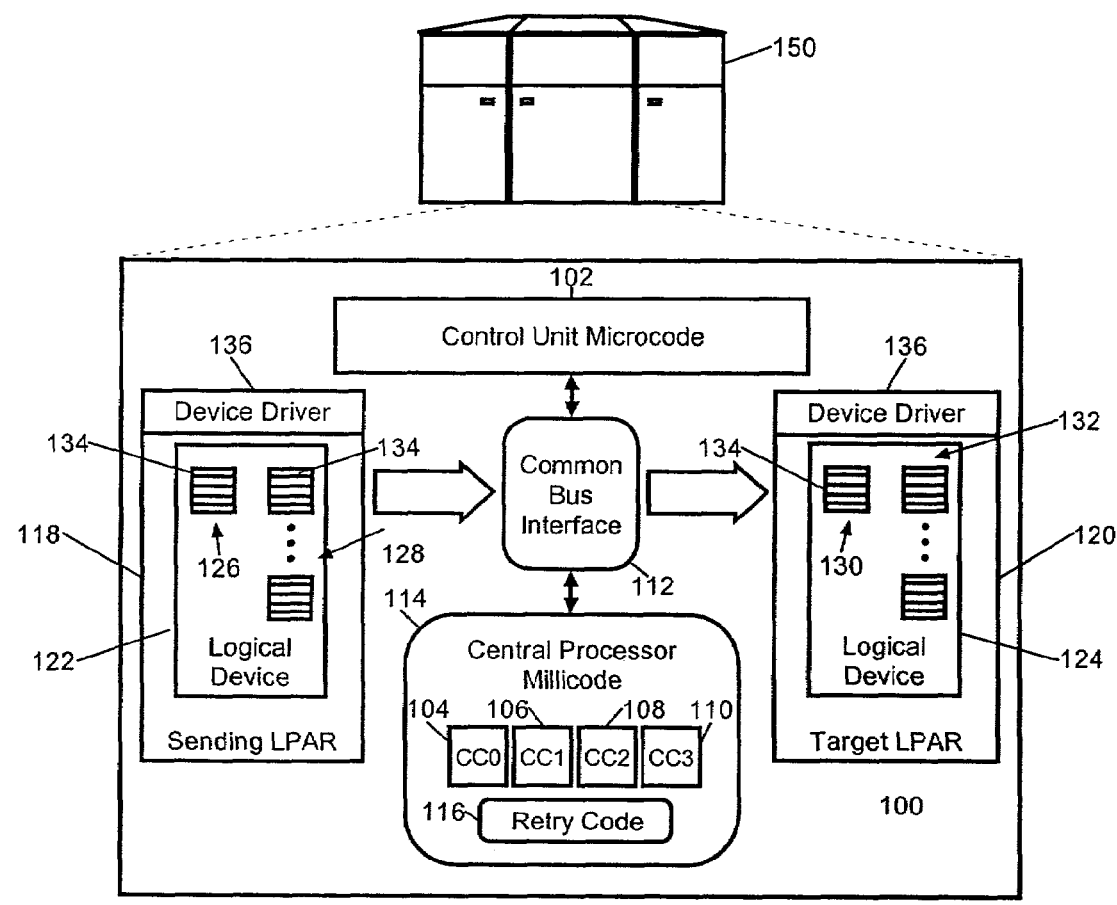
FIG. 1 is a schematic illustration of a iQDIO-enabled enterprise server configured with an I/O retry system in accordance with the inventive arrangements; and, FIGS. 2 through 4, taken together, is a flow chart illustrating an I/O retry method for use by the central processor and an associated device driver in an LPAR of the iQDIO-enabled enterprise server of FIG. 1.

FIG. 1 is a schematic illustration of an iQDIO-enabled enterprise server configured with an I/O retry system in accordance with the inventive arrangements. An iQDIO-enabled enterprise server 100 can include one or more LPARs 118, 120. Each of the LPARs 118, 120 can communicate with other LPARs 118, 120 using iQDIO technology. The iQDIO technology can include an control unit microcode 102 and central processor millicode 114, both in an iQDIO adapter. Using the iQDIO technology, individual LPARs 118, 120 can communicate with one across a common bus interface 112. Notably, the control unit microcode 102 can control access to the common bus interface 112 synchronously with the actions of the central processor millicode 114.

As will be apparent from FIG. 1, the LPARs 118, 120 can include, for exemplary purposes only, a sending LPAR 118 and a target LPAR 120. Each of the sending and target LPARs 118, 120 can include a specified logical device 122, 124 through which the LPARs 118, 120 can communicate with one another. The logical devices 122, 124, in turn, can include an inbound queue 126, 130 and one or more outbound queues 128, 132. As in the case of a conventional logic device used in a typical LPAR, the inbound and outbound queues 126, 128, 130 and 132 of the present invention can include one or more SBALs 134, each pointing to a portion of the common memory 112. Finally, individual device drivers 136 can control communications between LPARs 118, 120 across the common bus interface 112.

In operation, the central processor millicode 114 can prepare the target LPAR 120 to receive data packets transmitted by the sending LPAR 118 by queuing SBALs 134 in the inbound queue 130 of the target LPAR 120. Through this queuing action, associated read buffers in memory can be made available for use by the central processor millicode 114 of the sending LPAR 118. The sending LPAR 118, in turn, through the device driver 136 can associate an SBAL 134 in one of its sending queues 128 with the data packets to be transmitted to the target LPAR 120.

Subsequently, the sending LPAR 118 can invoke a SIGA directive indicating to the central processor millicode 114 that the sending LPAR 118 is attempting to forward the data packets referenced by the SBAL 134 to the target LPAR 120. Responsive to receiving the SIGA-w instruction, the central processor millicode can locate the target LPAR 120 and, in coordination with the device drivers 136 of both the sending and target LPARs 118, 120, can move the outbound data packets from the SBAL 134 in the outbound queue 128 of the sending LPAR 118 to one or more previously queued SBALs 134 of the inbound queue 130 of the target LPAR 120. Once the inbound data packets have been forwarded to the target LPAR 120, the operation can be completed by marking those queued SBALs 134 in the inbound queue as "complete".

Importantly, as is well-known in the art, on some occasions, interprocess communications between two LPARs 118, 120 can fail. For example, the central processor millicode 114 can fail to locate or lock in on the target LPAR 120 or the inbound queue 130 in the target LPAR 120. Also, the target LPAR 120 can experience a "no storage condition". Unlike prior art interprocess communications systems, however, in the present invention, retry logic 116 can be included with the central processor millicode 114, the device drivers 136, or both. Specifically, the retry logic 116 can intelligently retry attempted interprocess communications between the LPARs 118, 120.

In accordance with the present invention, the well-known SIGA directive can be subdivided into a SIGA-w directive, a SIGA-y directive and a SIGA-f directive. The SIGA-w directive can represent a conventional write request. By comparison, the SIGA-y directive can represent a retry request which can follow either a SIGA-w or a SIGA-y. Unlike the SIGA-w and the SIGA-y directives, the SIGA-f directive, can represent a "final" attempt at retrying a SIGA-w directive.

To assist the retry logic 116 in its task, condition codes can be provided for use in the present invention. The condition codes can include CC0, CC1, CC2 and CC3. Moreover, in addition to the setting of the CC0, CC1, CC2, CC3 conditions 104, 106, 108, 110, an SLSB status code can be returned to the sending LPAR 118. The SLSB status code can correspond to each SBAL in a target LPAR 120 and can indicate the final status of a SIGA-w operation. For example, a status code of 0xA1 can indicate that the write operation has completed successfully. In contrast, a status code of 0xAF can indicate that an error has occurred. Where an error has occurred, a reason code can be used to indicate why the error has occurred, for instance where the target LPAR 120 could not be found.

Responsive to a SIGA directive, a CC0 condition 104 can be set where an instruction has been processed, albeit not necessarily successfully. The CC1 condition 106, by comparison, can be set for all non-recoverable errors in the target LPAR 120. For example, a non-recoverable error can include, but is not limited to: image not found, subchannel not found, queue not found, IP address not resolved, etc. Similar to the CC1 condition 106, the CC3 condition 110 reflects a non-recoverable error in the sending LPAR 118 that results in a loss of connectivity. Examples can include where the subchannel has halted, and all permanent errors such as no paths, not QDIO_Active, etc.

The CC2 condition 108, unlike the CC1 and CC2 conditions 106, 110, relates not to a non-recoverable error, but a recoverable error. More particularly, as a result of a CC2 condition 108, the central processor millicode 114 and the device driver 136 can retry the completion of the data transfer for a discrete number of times. If, after the discrete number of retry attempts the central processor millicode 114 and the device driver 136 still cannot complete the transaction, the CC0 condition 102 can be posted to the sending LPAR 118 along with a suitable error code and reason code.

In accordance with the present invention, the CC2 condition 108 can indicate that an instruction cannot be processed in consequence of a "busy condition". The synchronous busy condition can be indicated where a general purpose register is set high. The synchronous busy condition can arise when the central processor millicode 114 cannot obtain a queue lock on the target LPAR 120. When the high bit of the general purpose register has been set ("ON"), the SLSB need not be altered, the SBALs 134 remain under the control of the control unit microcode 102, and the index into the inbound queue 130 need not be incremented. Still, central processor millicode 114 can retry the data transfer immediately in a synchronous fashion using the same index into the inbound queue 130 for a discrete number of times. If, after the discrete number of retry attempts the central processor millicode 114 still cannot complete the transaction, a CC0 condition 102 can be posted to the sending LPAR 118 along with suitable error and reason codes.

By comparison to the synchronous busy condition, an "asynchronous busy" condition can arise where a temporary busy condition has occurred. For instance, an asynchronous busy condition can arise where all target LPAR 120 conditions have been resolved, but the inbound queue 130 does not have an available SBAL 134. When this "no storage" condition has been detected and the CC2 condition 108 has been set with the high-bit of the general purpose register "OFF", the SLSB also can be set to an appropriate error code and a reason code can be set to, "Receiver Out-Of-Storage (OOS)". As will be apparent to one skilled in the art, the CC2 condition 108 with the high bit OFF denotes a retriable error that can result in the central processor millicode 114 and the device driver 136 attempting to move data to the target LPAR 120 in an asynchronous fashion.

Figure 2:
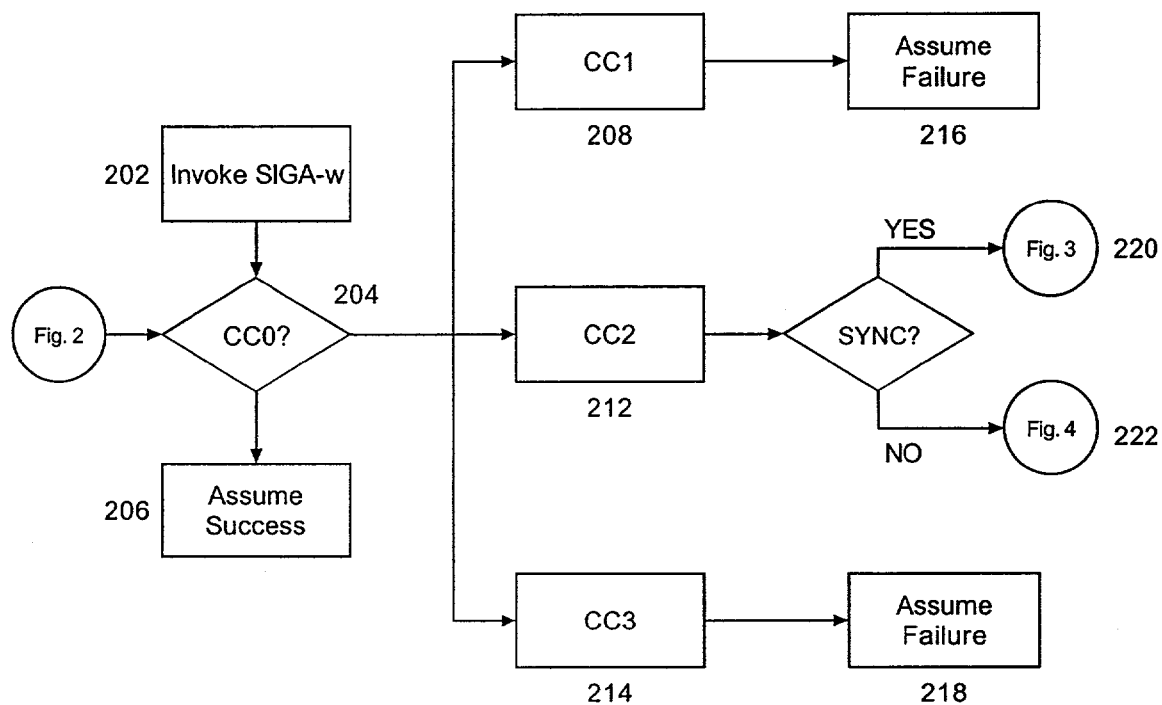
Figure 3:
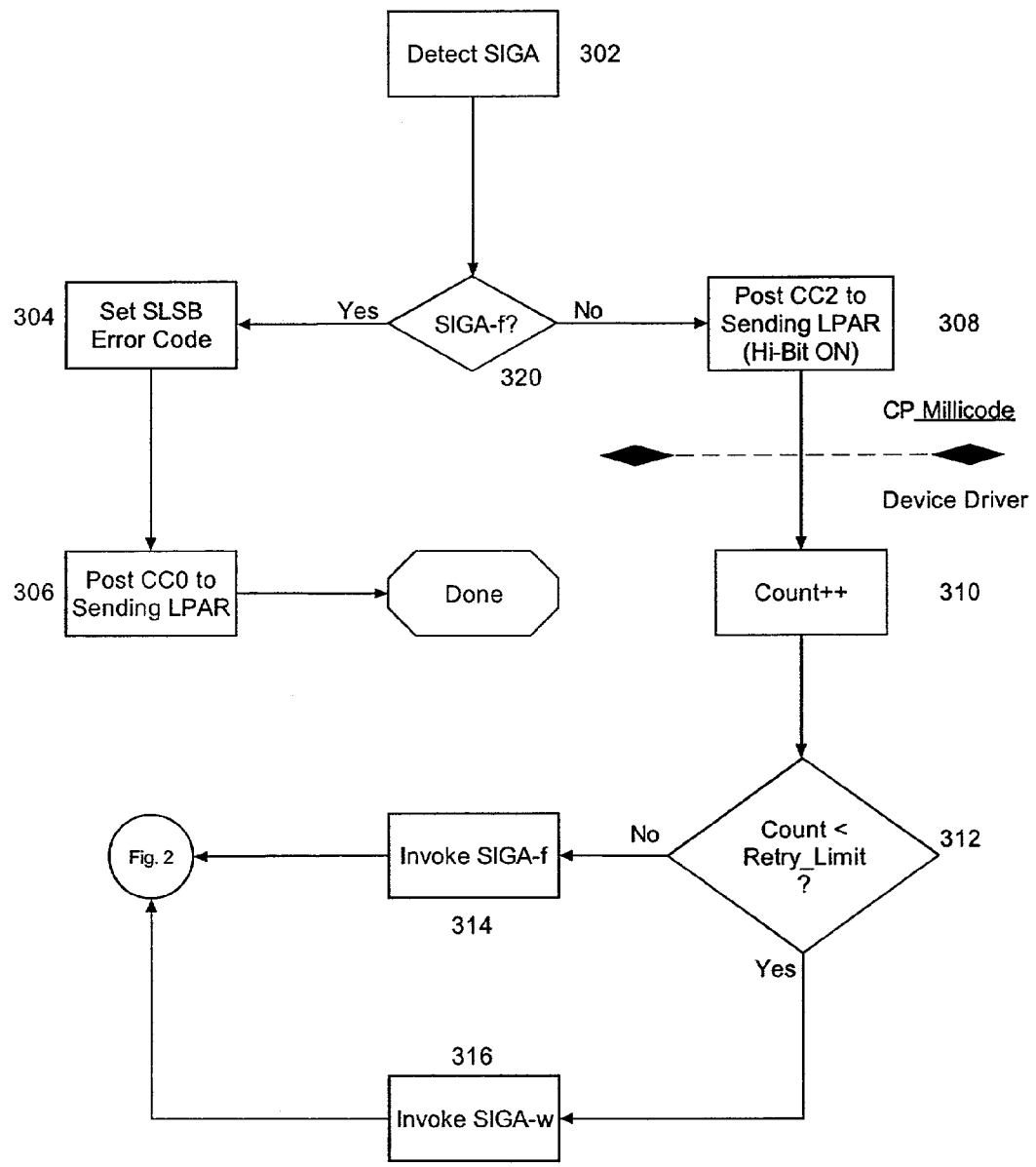
Figure 4:
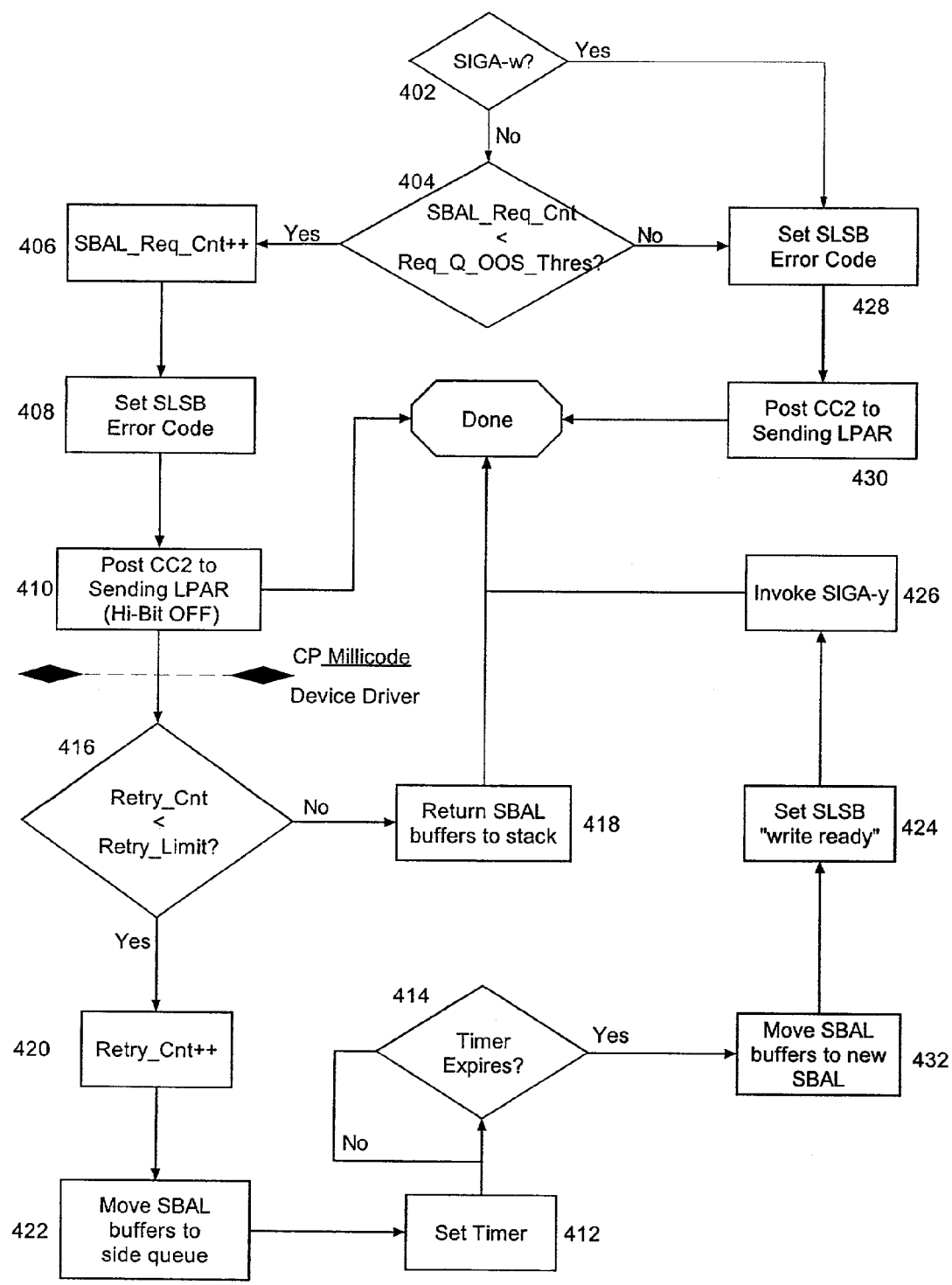

FIGS. 2 through 4, taken together, are a flow chart illustrating an I/O retry method for use in the iQDIO-enabled enterprise server of FIG. 1. The process can begin in block 202 of FIG. 2 in which a SIGA-w directive can be posted. In particular, the SIGA-w directive can order the transfer of data from an SBAL in an outbound queue of a sending LPAR, to a previously queued SBAL in an inbound queue of a target LPAR. If decision block 204, the central processor millicode detects a condition code of CC0, in block 206 it can be assumed that the data transfer process has completed, albeit not necessarily successfully. Otherwise, a condition code can be set which provides the central processor millicode with additional error information not typically available in conventional QDIO technology. Specifically, the condition code can be one of a CC1, CC2 and CC3 condition.

In block 208, if a CC1 condition has been posted to the sending LPAR, the attempted transfer can be assumed to have failed in block 216. Notably, in the case of a CC1 condition, the data transfer cannot be programmatically and automatically retried. Similarly, in block 214, if a CC3 condition has been posted to the sending LPAR, the attempted transfer can be assumed to have failed in block 218. Again, as in the case of a CC1 condition, the data transfer cannot be programmatically and automatically retried. Still, in block 212, if a CC2 condition has been detected, though the data transfer will have failed temporarily, the data transfer can be programmatically and automatically retried. In that regard, it can be determined by reference to the general purpose register bit whether the temporary error condition is a synchronous busy condition, or an asynchronous busy condition.

Turning now to FIG. 3, a flow chart illustrated therein depicts the retry process associated with a CC2 synchronous busy condition. Beginning in block 302, a SIGA can be detected. In block 320, it can be determined whether the SIGA is a SIGA-f denoting a final attempt to transfer data originally attempted in a previous, unsuccessful SIGA-w which resulted in a CC2 condition. If the SIGA detected in block 320 is a SIGA-f, in block 304 the SLSB can be set to a suitable error code and in block 406, a CC0 condition can be posted to the sending LPAR.

Otherwise, if in block 320 it is determined that the detected SIGA is not a SIGA-f, in block 308 a CC2 condition can be posted to the sending LPAR. Upon detecting the posted CC2 condition, the device driver of the sending LPAR in block 310 can increment the retry counter. If, in block 312, the incremented count does not exceed a pre-determined retry limit, in block 316 the SIGA-w directive can be invoked and the process can return through block 204 of FIG. 2. Otherwise, in block 314 a SIGA-F can be invoked in block the process can return through block 204 of FIG. 2.

FIG. 4, is a flow chart illustrating a retry process associated with an asynchronous busy condition. Beginning in block 402, a SIGA-w can be detected. In decision block 404, it can be determined whether the number of times an SBAL has been requested by the central processor millicode has exceeded a pre-determined threshold. In particular, a counter can be compared to a pre-configured threshold value referred to as a "Receive Queue OOS Threshold". The counter, in turn, can track the number of original SIGA-w directives that have been invoked by all sending LPARs to a specific inbound queue while that inbound queue has experienced an out-of-storage condition. Notably, the counter can be incremented not for retry-based SIGA-y directives, but for original SIGA-w directives. When the out-of-storage condition clears, the counter can be reset.

If in decision block 404, the counter has not exceeded the OOS threshold, the counter can be incremented in block 406, in block 408 the SLSB error code can be set and in block 410, a CC2 condition can be posted to the sending LPAR with the high bit of the general purpose register reset (OFF). Otherwise, the SLSB error code can be set in block 428 and a CC2 condition can be posted to the sending LPAR. In any case, in the sending LPAR, responsive to detecting the CC2 condition, in block 416 it can be determined whether a retry counter has exceeded a pre-determined retry limit. Specifically, if the number of retries attempted during the CC2 condition (stored in a retry counter) has exceeded a pre-defined retry limit, in block 418 the SBAL buffers can be released in common memory for use by other processes.

If, however, in block 416 it is determined that the retry counter has not exceeded the pre-determined retry limit, in block 420 the retry counter can be incremented. Subsequently, a delay process can occur in which the sending LPAR can delay retransmission in order to allow necessary SBALs in the inbound queue of the target LPAR to become available. In particular, in block 422 the SBAL buffers can be moved to a side queue. In block 412 a timer can be set and in block 414, only when the timer expires will the process continue in block 432. In block 432 the SBAL buffers can be moved to a new SBAL. Subsequently, in block 424 the SLSB can be set to "write ready" and in block 426, a SIGA-y (retry) can be invoked denoting an attempt to retry the data transfer between the sending LPAR and the target LPAR.

Importantly, the process illustrated in FIG. 4 can repeat in the sending LPAR so long as the condition remains set to CC2 and the number of retries reflected in the retry counter has not exceeded the retry limit. Once the process of FIG. 4 has resulted in the successful transfer of data from the sending LPAR to the receiving LPAR, the retry counter can be reset. Conversely, in those cases where the retry count has exceeded the retry limit, the retry counter can be reset. In any case, the intelligent and asynchronous retry process of FIG. 4 provides a substantial enhancement to prior art methods of processing QDIO-based OOS conditions in a target LPAR.

Importantly, as one skilled in the art will recognize, the asynchronous busy condition primarily relates to a retry process configured to handle an OOS condition in the inbound queue of the target LPAR. By comparison, the synchronous busy condition primarily relates to a retry process configured to handle the inability to obtain a queue lock on a target LPAR. In consequence, whereas the retry process associated with the CC2 condition includes an asynchronous and purposely delayed attempt to retry a data transfer, the condition includes a synchronous and purposely hurried attempt to retry the data transfer. The combination of retry processes, however, provide an advantage over prior art retry methodologies inasmuch as a suitable retry process can be automatically selected based upon the varying reasons for a data transfer failure in a QDIO-based system.

The present invention can be realized in hardware, software, or a combination of hardware and software. An implementation of the method and system of the present invention can be realized in a centralized fashion in one computer system, although any kind of computer system, or other apparatus adapted for carrying out the methods described herein, is suited. A typical combination of hardware and software could be a enterprise server computer system configured with millicode which, when loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. In an enterprise-server configured with queued direct input/output (QDIO), an input-output (I/O) retry method, the method comprising:

attempting a QDIO-based data transfer between outbound and inbound queues in respective sending and target logical partitions (LPARs) in the enterprise server;

responsive to detecting a busy condition resulting from said attempt, determining whether said busy condition arose from an asynchronous busy condition in said target LPAR;

further determining whether said busy condition arose from a synchronous busy condition; and, if it is determined that said busy condition arose from an asynchronous busy condition in said target LPAR, delaying any attempt to retry said QDIO-based data transfer, and subsequent to said delay, re-attempting said QDIO-based data transfer, but if it is determined that said failure condition arose from a synchronous busy condition, immediately and repeatedly re-attempting said QDIO-based data transfer either until said re-attempts are successful, or until said repeated re-attempts exceed a threshold limit, and, if said repeated re-attempts exceed said threshold limit, posting an error condition from which no retry can be attempted;

wherein said determining step comprises the step of determining whether said synchronous busy condition arose from an inability to obtain a queue lock on said target LPAR.

2. A queued direct input/output (QDIO) retry system comprising:

a common bus interface;

a plurality of logical partitions (LPARs), said LPARs comprising at least one sending LPAR and at least one receiving LPAR, each said sending LPAR comprising at least one outbound queue, each said receiving LPAR comprising an inbound queue, each said queue comprising a plurality of storage block address lists (SBALs), each said SBAL comprising pointers to memory blocks accessible through said common bus interface;

a QDIO system configured to execute data transfers between said sending and receiving LPARs over said common bus interface;

a plurality of condition codes, at least one of said condition codes specifying a retriable error condition arising from one of an asynchronous and a synchronous busy condition in a target LPAR, and at least one of said condition codes specifying non-retriable error condition; and, a retry processor configured to asynchronously retry data transmissions responsive to detecting said asynchronous busy condition, and to synchronously retry data transmissions responsive to detecting said synchronous busy condition.

3. A machine readable storage, having stored thereon an input/output (I/O) retry computer program for operation in an enterprise-server configured with queued direct input/output (QDIO), the computer program comprising a routing set of instructions for causing the machine to perform the steps of:

attempting a QDIO-based data transfer between outbound and inbound queues in respective sending and target logical partitions (LPARs) in the enterprise server;

responsive to detecting a busy condition resulting from said attempt, determining whether said busy condition arose from an asynchronous busy condition in said target LPAR;

further determining whether said busy condition arose from a synchronous busy condition; and, if it is determined that said busy condition arose from an asynchronous busy condition in said target LPAR, delaying any attempt to retry said QDIO-based data transfer, and subsequent to said delay, re-attempting said QDIO-based data transfer, but if it is determined that said failure condition arose from a synchronous busy condition, immediately and repeatedly re-attempting said QDIO-based data transfer either until said re-attempts are successful, or until said repeated re-attempts exceed a threshold limit, and, if said repeated re-attempts exceed said threshold limit, posting an error condition from which no retry can be attempted;

wherein said determining step comprises the step of determining whether said synchronous busy condition arose from an inability to obtain a queue lock on said target LPAR.

* * * * *